(12) United States Patent
Rutkowski et al.

(10) Patent No.: US 7,685,669 B2
(45) Date of Patent: Mar. 30, 2010

(54) FEED CONTROL DEVICE FOR PLUMBING TOOLS

(75) Inventors: Michael J. Rutkowski, Brunswick, OH (US); Jon R. Dunkin, Elyria, OH (US)

(73) Assignee: Emerson Electric Co., St. Louis, MO (US)

( * ) Notice: Subject to any disclaimer, the term of this patent is extended or adjusted under 35 U.S.C. 154(b) by 1295 days.

(21) Appl. No.: 11/179,957

(22) Filed: Jul. 12, 2005

(65) Prior Publication Data

US 2005/0246846 A1    Nov. 10, 2005

Related U.S. Application Data

(63) Continuation-in-part of application No. 10/792,983, filed on Mar. 4, 2004, now Pat. No. 7,478,451.

(51) Int. Cl.
  *B08B 9/045* (2006.01)
  *B08B 9/043* (2006.01)
(52) U.S. Cl. ........ 15/104.33; 15/104.31; 254/134.3 FT; 226/143; 74/424.77; 74/424.81
(58) Field of Classification Search .............. 15/104.33, 15/104.31, 104.32; 254/134.3 FT; 226/143; 74/424.77, 424.81
See application file for complete search history.

(56) References Cited

U.S. PATENT DOCUMENTS

| | | |
|---|---|---|
| 3,224,024 A | 12/1965 | Hunt |
| 3,329,044 A | 7/1967 | Singer |
| 3,394,599 A | 7/1968 | Tucker |
| 4,580,306 A | 4/1986 | Irwin |
| 4,995,132 A | 2/1991 | Seitz |
| 5,029,356 A | 7/1991 | Silverman et al. |
| 5,031,263 A | 7/1991 | Babb et al. |
| 5,031,276 A | 7/1991 | Babb et al. |
| 5,239,724 A | 8/1993 | Salecker et al. |
| 5,901,401 A | 5/1999 | Rutkowski et al. |

(Continued)

FOREIGN PATENT DOCUMENTS

EP     0 348 799     6/1989

(Continued)

OTHER PUBLICATIONS

PCT/US2006/026866—(Form PCT/ISA/206)—Invitation to Pay Additional Fees with ANNEX—Communication Relating to the Results of the Partial International Search; Date of Mailing Nov. 23, 2006; 5 pages.

(Continued)

*Primary Examiner*—Gary K Graham
(74) *Attorney, Agent, or Firm*—Rankin, Hill & Clark LLP

(57) ABSTRACT

A snake feeding device comprises a base having opposite ends, an actuator pivotally mounted on the base, and first and second sets of drive rolls spaced apart in the direction between ends of the base. Each set includes a roll on the base and two rolls on the actuator for engaging a snake therebetween and displacing the snake relative to the base in the direction between the ends thereof in response to rotation of the snake. The actuator selectively displaces the rolls of each set relative to one another.

21 Claims, 16 Drawing Sheets

U.S. PATENT DOCUMENTS

| | | | |
|---|---|---|---|
| 6,009,588 | A | 1/2000 | Rutkowski |
| 6,158,076 | A | 12/2000 | Rutkowski et al. |
| 6,243,905 | B1 | 6/2001 | Rutkowski |
| 6,343,398 | B1 | 2/2002 | Silverman |
| 6,360,397 | B1 | 3/2002 | Babb |
| 6,470,525 | B1 | 10/2002 | Silverman |
| 6,655,228 | B1 | 12/2003 | Margherio et al. |

FOREIGN PATENT DOCUMENTS

| | | |
|---|---|---|
| GB | 860906 | 2/1961 |

OTHER PUBLICATIONS

PCT/US2006/026866—Notification of Transmittal of the Inernational Search Report and the Written Opinion of the International Searching Authority, or the Declaration (Form PCT/ISA/220) Date of Mailing, Jan. 9, 2007; 2 pages.

International Search Report (Form PCT/ISA/210); Date of Mailing, Jan. 9, 2007; 6 pages.

Written Opinion of the International Searching Authority—(Form PCT/ISA/237); Date of Mailing, Jan. 9, 2007; 9 pages.

FEED CONTROL DEVICE FOR PLUMBING TOOLS

BACKGROUND OF THE INVENTION

This application is a continuation-in-part of application Ser. No. 10/792,983 filed Mar. 4, 2004 now U.S. Pat. No. 7,478,451.

This invention relates to the art of drain cleaning apparatus and, more particularly, to an improved feed control arrangement by which a flexible snake of such apparatus can be axially advanced and retracted relative thereto during a drain cleaning operation.

It is of course well known to provide manually operable feed control devices for advancing and retracting a drain cleaning snake relative to a drain being cleaned. In some such devices, a plurality of rolls are supported in a housing, or the like, through which the snake extends, and the rolls are spaced apart about the periphery of the snake. The rolls have neutral and engaged positions relative to the snake and in which the snake, when rotated, respectively rotates in place and is axially displaced relative to the housing. In some designs, the rolls are skewed relative to the axis of the snake so as to axially displace the snake in one direction relative to the housing in response to rotation of the snake in one direction, and axial displacement of the snake in the opposite direction is achieved by reversing the direction of rotation of the snake. Examples of an arrangement of this are shown in U.S. Pat. No. 5,901,401 to Rutkowski, et al., U.S. Pat. No. 6,009,588 to Rutkowski, and U.S. Pat. No. 6,158,076 to Rutkowski, et al. In other designs, axial displacement of the snake in opposite directions relative to the housing is achieved by rotating the snake in just one direction and reversing the skew of the rolls relative thereto. Such an arrangement is shown, for example, in U.S. Pat. No. 5,031,276 to Babb, et al.

More recent feeding devices of the latter character are disclosed in U.S. Pat. No. 6,360,397 to Babb wherein the skew of the rolls is reversible by relative rotational displacement of housing members in which the rolls are supported, and in U.S. Pat. No. 6,655,228 to Margherio, et al. wherein two pairs of rolls are axially spaced apart in a housing and a third roll is mounted axially therebetween and is shiftable to selectively engage the snake against one or the other of the roll sets. All of the foregoing patents are incorporated herein by reference for background information.

The power source by which a drain cleaning snake is rotated can be a handheld, crank operated drain cleaner such as shown for example in the aforementioned U.S. Pat. No. 6,158,076 to Rutkowski, et al. a trigger actuated motor driven drain cleaner such as are shown, for example, in U.S. Pat. No. 3,224,024 to Hunt and U.S. Pat. No. 5,029,356 to Silverman, et al., or somewhat larger, ground-supported drain cleaners such as are shown for example in U.S. Pat. No. 4,580,306 to Irwin, U.S. Pat. No. 5,031,263 to Babb, et al., and U.S. Pat. No. 5,239,724 to Salecker, et al., the disclosures of which are also incorporated herein by reference for background information.

The control devices which do not require reversal of the direction of rotation of the snake in order to achieve displacement thereof in axially opposite directions are advantageous for a number of reasons. In this respect, for example, operation of the drain cleaning apparatus is made easier for the user by the lafter's not having to manipulate a reversing switch for the drive motor. At the same time, however, the arrangements heretofore provided for axially displacing a snake in opposite directions without changing the direction of rotation of the snake are structurally complex and at least somewhat cumbersome to operate in requiring the user to manipulate at least one and sometimes two components to achieve reversal of the direction of the snake drive.

SUMMARY OF THE INVENTION

A snake feed control device is provided in accordance with the present invention which retains the advantages of devices heretofore available and operable to obtain reversal of the axial displacement of a snake relative to the feed device without changing the direction of rotation of the snake about its axis while minimizing or overcoming the disadvantages of such devices and providing improvements in the maneuverability and ease of operation thereof. More particularly in this respect, a feed control device in accordance with the present invention is elongate in the direction of axial displacement of the snake, providing a user friendly size and profile for the device, and comprises, basically, base and actuator members which cooperate, selectively, to provide for axial displacement of a snake in opposite directions without changing the direction of rotation of the snake. Further in this respect, one of the members is displaceable relative to the other by a simple axially directed sliding movement of the user's hand, such movement in one direction providing for advancing the snake into a drain and, in the other direction, providing for retraction of the snake from the drain. Preferably, the snake driving components are two groups of rollers axially spaced apart relative to a snake to be displaced, each group comprising a pair of rollers on one of the members and at least one roller on the other member. Displacement of a user's hand axially of the two members in one direction brings the corresponding roll set into engagement with a snake to axially displace the latter in one direction relative to the two members, and axial displacement of the user's hand in the opposite direction brings the rolls of the other group into engagement with the snake to cause displacement of the latter in the opposite direction, both displacements being achieved with rotation of the snake in just one direction about its axis.

It is accordingly an outstanding object of the present invention to provide an improved feed control device for achieving axial displacement of a drain cleaning snake in opposite directions relative to the device.

Another object is the provision of a feed control device of the foregoing character in which displacement of the snake in axially opposite directions relative thereto is achieved by an axial displacement of the user's hand in opposite directions relative to the device.

A further object is the provision of a feed control device of the foregoing character comprising a minimum number of component parts which are structurally interrelated to promote ease of operation, economy with respect to manufacture, and efficiency with regard to directional displacement of a flexible snake relative to a drain to be cleaned.

Yet another object is the provision of a feed device of the foregoing character which is operable in response to axial displacement of a user's hand in opposite directions relative to a direction of displacement of a snake relative to the device.

Still another object is the provision of a device of the foregoing character comprising axially spaced apart groups of drive rolls on relatively displaceable members of the device such that axial displacement of a user's hand in opposite directions relative to the device alternately displaces the groups of roll into driving engagement with a snake therebetween to, alternately, axially displace the snake in opposite directions relative to the device.

BRIEF DESCRIPTION OF THE DRAWINGS

The foregoing objects, and others, will in part be obvious and in part pointed out more fully hereinafter in conjunction with the written description of a preferred embodiment of the invention illustrated in the accompanying drawings in which.

DESCRIPTION OF PREFERRED EMBODIMENTS

Figure 1:
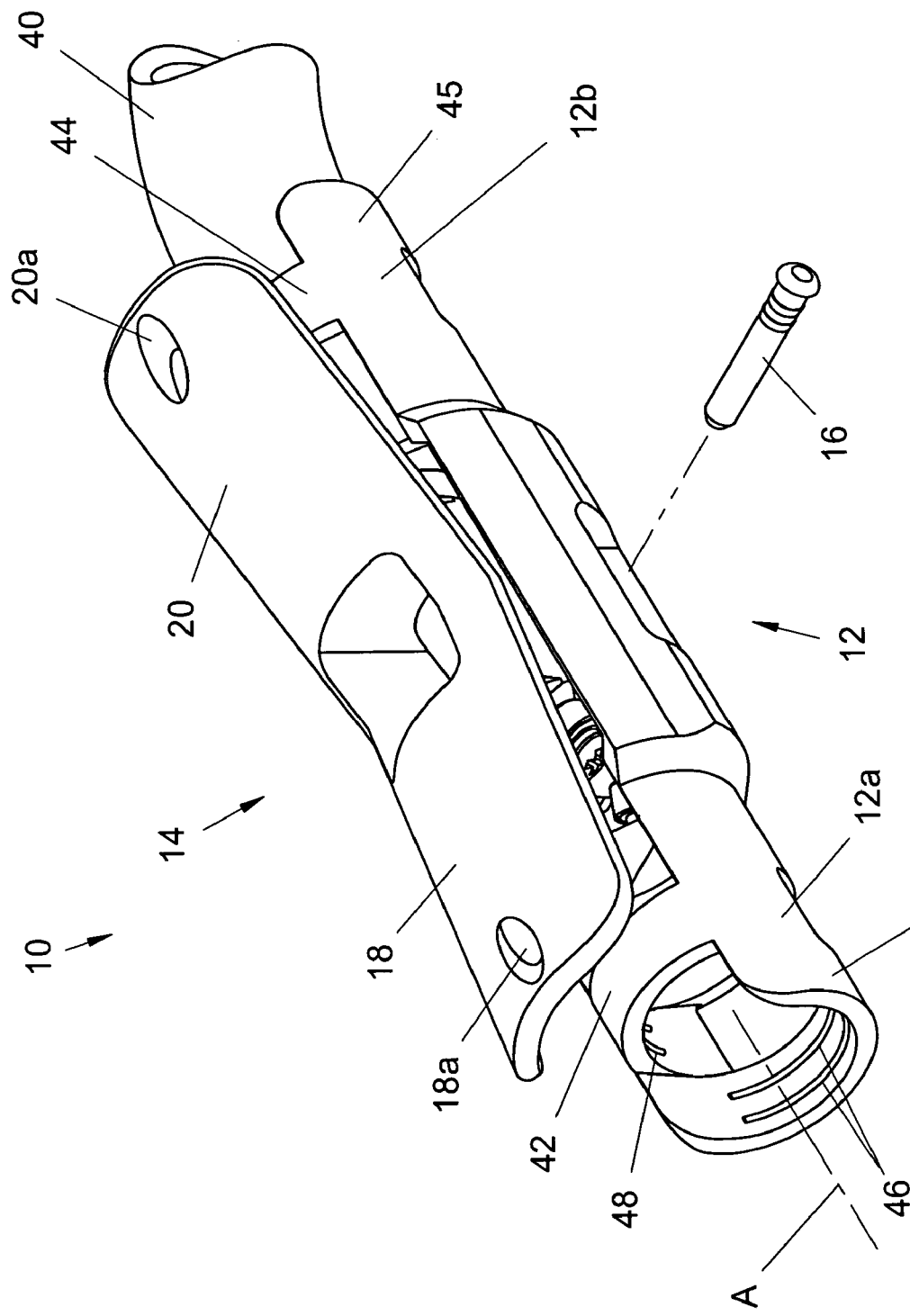
FIG. 1 is a perspective view of a snake feeding mechanism in accordance with the present invention.
Figure 2:
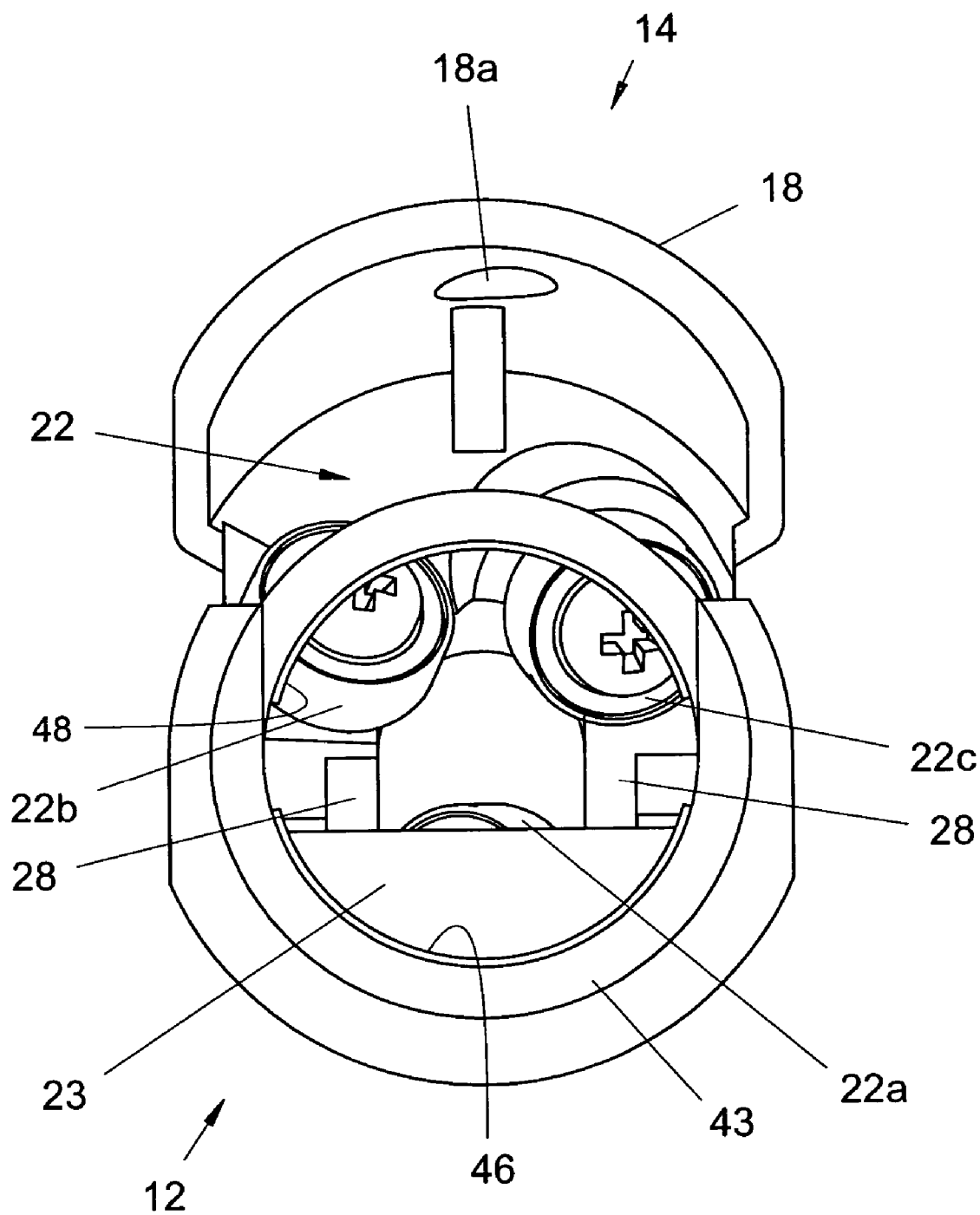
FIG. 2 is an end elevation view of the feeding device looking from left to right in FIG. 1.
Figure 3:
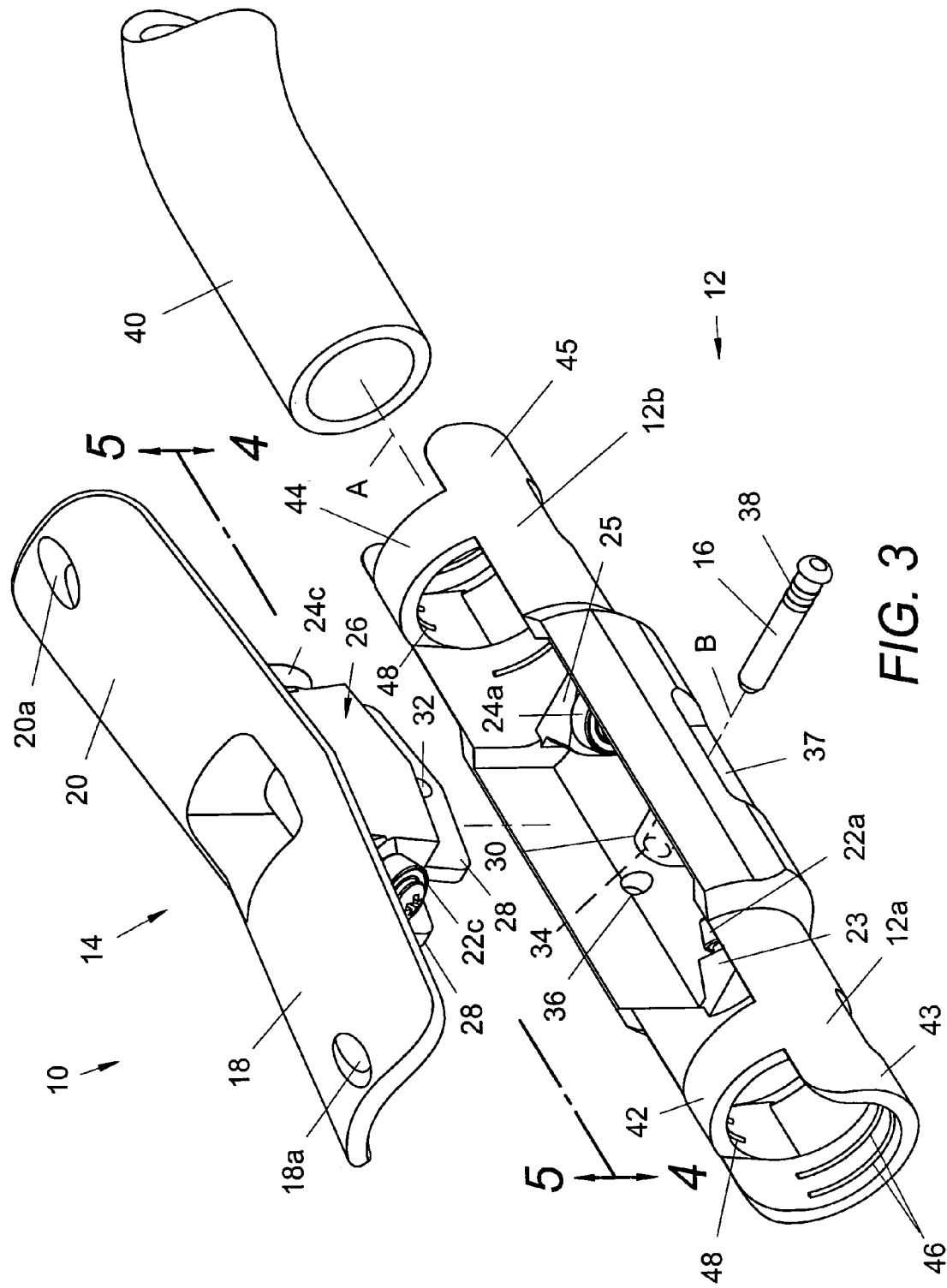
FIG. 3 is an exploded view of the base, actuator and pivot pin components of the feeding device.
Figure 4:
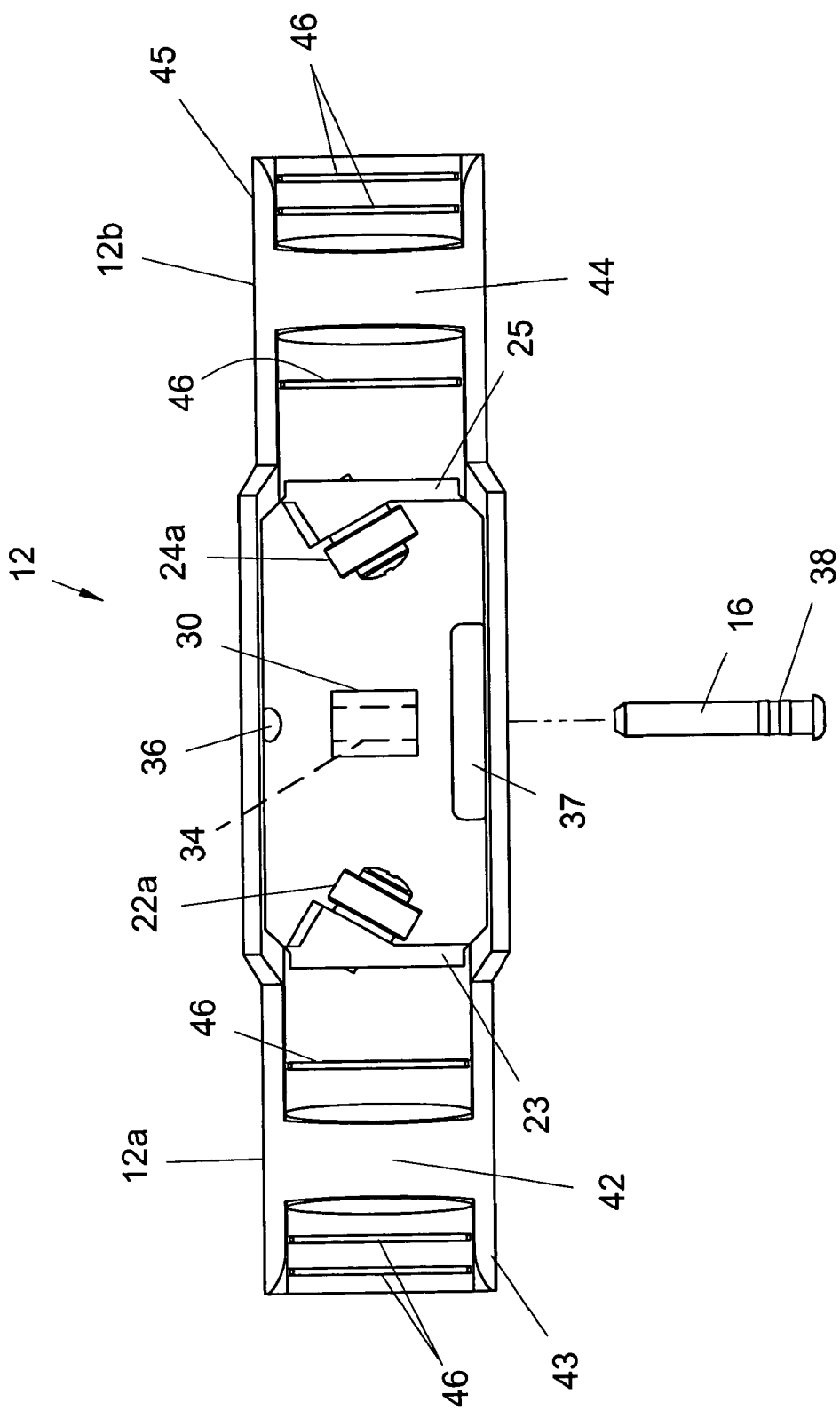
FIG. 4 is a plan view of the base looking in the direction of line 4-4 in FIG. 3.
Figure 5:
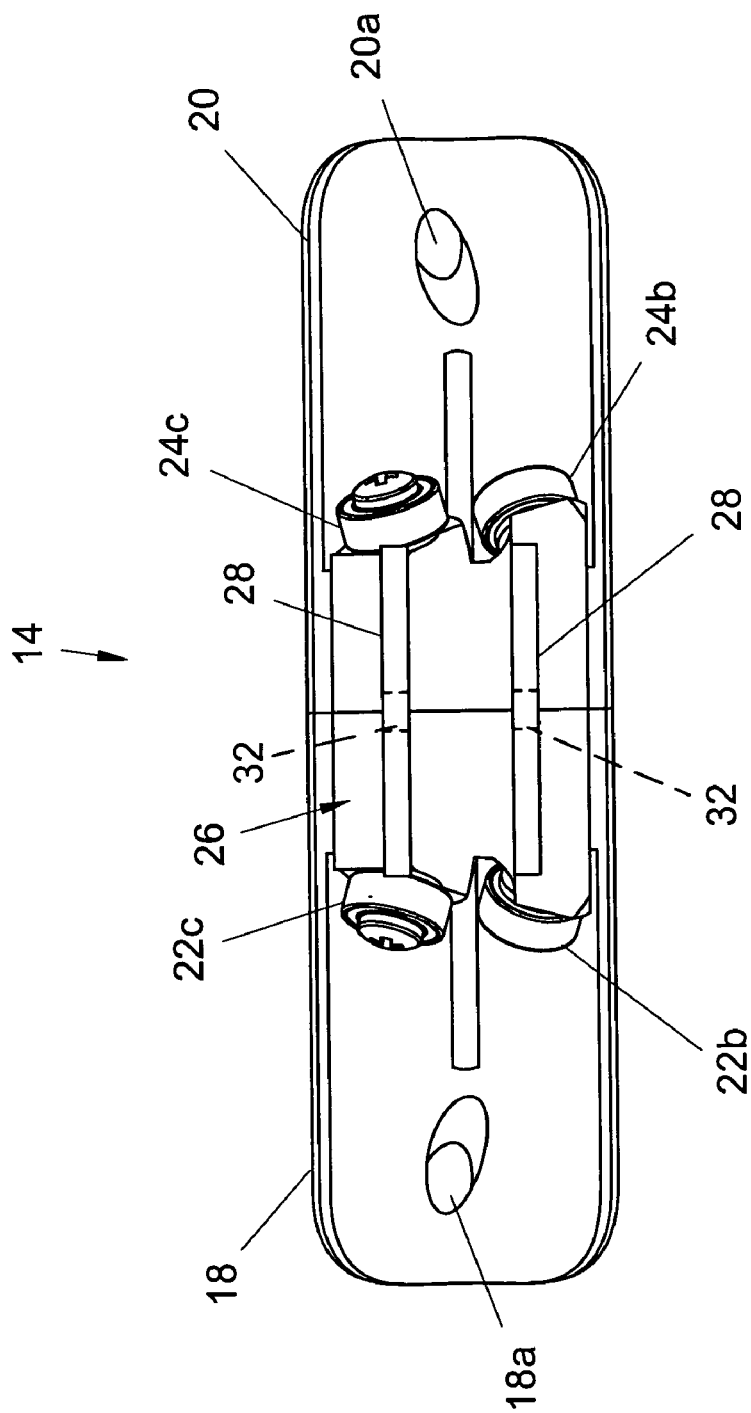
FIG. 5 is a plan view of the underside of the actuator looking in the direction of line 5-5 in FIG. 3.

Referring now in greater detail to the drawings, wherein the showings are for the purpose of illustrating preferred embodiments of the invention only, and not for the purpose of limiting the invention, FIGS. 1-5 illustrate a snake feeding device 10 which, in accordance with the invention, is operable to selectively drive a drain cleaning snake, not shown, in opposite directions relative to axis A of the device. In this embodiment, the device comprises, basically, two component parts, namely a trough-shaped base 12 having axially opposite ends 12a and 12b and an actuator 14 which axially overlies the base and is pivotally interconnected therewith by means of a pin 16 which provides a pivot axis B transverse to axis A and generally centrally between the opposite ends of the base. The base and actuator components can be of metal or a suitable plastic such as, for example, a fiber filled polypropylene. Actuator 14 includes legs 18 and 20 extending in axially opposite directions relative to axis B and at an angle to one another which, as will become apparent hereinafter, provides for the legs to be alternately displaced toward base 12. The snake feeding device further includes first and second sets of drive rolls 22 and 24, respectively, which sets are axially spaced apart and on axially opposite sides of pivot pin 16. In the embodiment illustrated in FIGS. 1-5, roll set 22 includes a single roll 22a mounted on a wall 23 in base 12 and a pair of rolls 22b and 22c mounted on leg 18 of actuator 14, and roll set 24 includes a single roll 24a mounted on a wall 25 in base 12 and a pair of rolls 24b and 24c mounted on leg 20 of the actuator. Rolls 22a, 22b and 22c are canted relative to axis A so as to drive a snake in one direction relative to the device when the rolls of set 22 engage about the snake and the latter is rotated, and rolls 24a, 24b and 24c are canted in the opposite direction relative to axis A so that a snake engaged between the rolls of roll set 24 is driven in the opposite direction relative to the device in response to rotation of the snake in the same direction. When the actuator is in the position shown in FIGS. 1 and 2, the rolls of sets 22 and 24 are spaced apart such that a snake extending through the device is not axially displaced relative thereto in response to rotation of the snake. This is a neutral position of the actuator. To displace the snake in the direction from end 12b towards end 12a of the base, for example, an operator holding base 12 in the palm of his or her hand will depress leg 18 of actuator 14 toward base 12, whereupon rolls 22b and 22c will displace the snake into engagement with roll 22a and the canting of the rolls will cause the snake to move axially in the latter direction. If the latter direction is that for advancing the snake into a drain to be cleaned, then the snake can be driven in the opposite direction by displacing leg 20 toward base 12, which movement displaces rolls 22b and 22c from the snake and moves rolls 24b and 24c to engage the snake against roll 24a, whereupon the snake is axially displaced in the direction from end 12a toward end 12b of the base.

In the embodiment illustrated in FIGS. 1-5, actuator 14 includes a central mounting portion 26 extending downwardly therefrom and having axially opposite ends, not designated numerically, upon which rolls 22b and 22c of roll set 22 and rolls 24b and 24c of roll set 24 are mounted. Mounting portion 26 includes a pair of downwardly extending trunnions 28 between the axially opposite ends thereof and which are spaced apart relative to axis B to receive a rib 30 on base 12 therebetween. Trunnions 28 are provided with pin openings 32 aligned with a pin opening 34 in rib 30 and a pin opening 36 in one of the laterally opposite sides of base 12. Pivot pin 16 extends through an elongate opening 37 in the other of the sides and through openings 32, 34 and 36 to removably mount actuator 14 on base 12. One of the outer ends of pin 16 is provided with barbs 38 which frictionally engage in opening 32 in the adjacent trunnion 28 to removably hold the pin in place. Removability of the pin is desired in connection with separating actuator 14 from base 12 to facilitate introducing a bulb auger on the end of a snake through the feeding device. The outer ends of actuator legs 18 and 20 are provided with openings 18a and 20a therethrough which provide tool access to the corresponding one of the rolls 22b and 24b on the actuator.

The feeding device can be used in a number of different ways. In this respect, for example, one or the other of the ends 12a and 12b of base 12 of the device can be attached to a flexible guide tube 40 as shown, for example, in U.S. Pat. No. 6,009,588 to Rutkowski mentioned herein. Alternatively, as shown in U.S. Pat. No. 6,158,067 to Rutkowski, et al., for example, the device can be mounted on the outer end of a handheld manually operated drain cleaner. Still further, it will be appreciated that the device can be mounted on or adjacent the frame or drum of a large motor driven drain cleaning machine as well as on the outer end of a handheld motor powered drain cleaner. Additionally, while not providing the stability achieved with mounting in the foregoing manner, the device can be held in a user's hand independent of attachment directly or indirectly to a drain cleaning machine so as to achieve axial displacement of the snake relative to the device in response to rotation of the snake relative thereto.

With regard to mounting a guide tube 40 to the device, ends 12a and 12b of base 12 are circular and have bridging portions 42 and 44, respectively spaced axially inwardly of the corresponding one of arcuate terminal ends 43 and 45 of the base, and the inner surfaces of the latter ends and the bridging portions, which are diametrically opposite each other, are provided with corresponding circumferentially extending ribs 46 and 48, respectively. Ribs 46 and 48 frictionally interengage with the outer surface of the guide tube which is thereby axially interengaged with the device by the pairs of ribs which cooperatively engage about the periphery of the guide tube. Other mounting arrangements can readily be devised to accommodate attachment of the feeding device to another device or apparatus.

Figure 6:
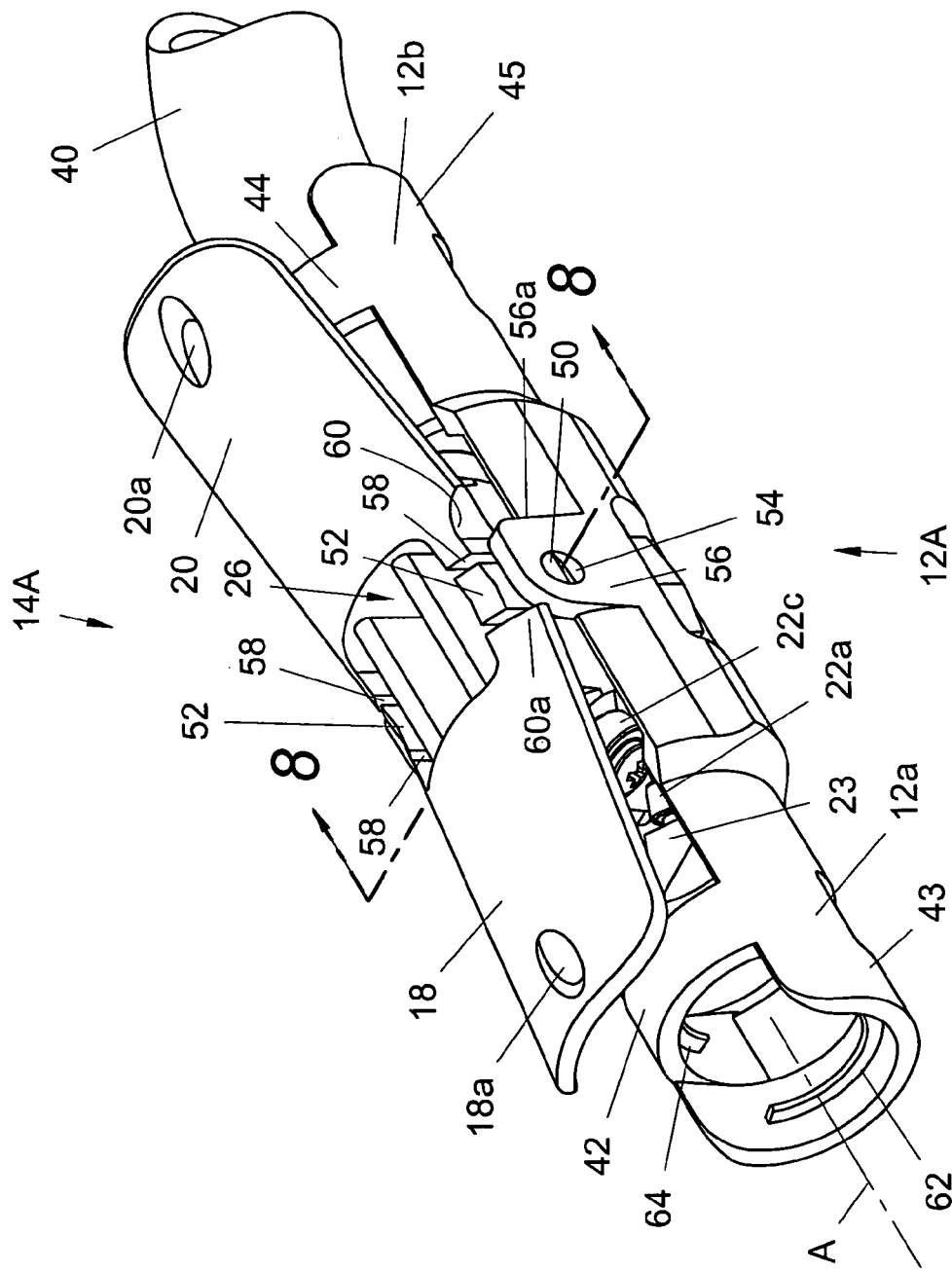
FIG. 6 is a perspective view of another embodiment of a snake feeding device in accordance with the invention.
Figure 7:
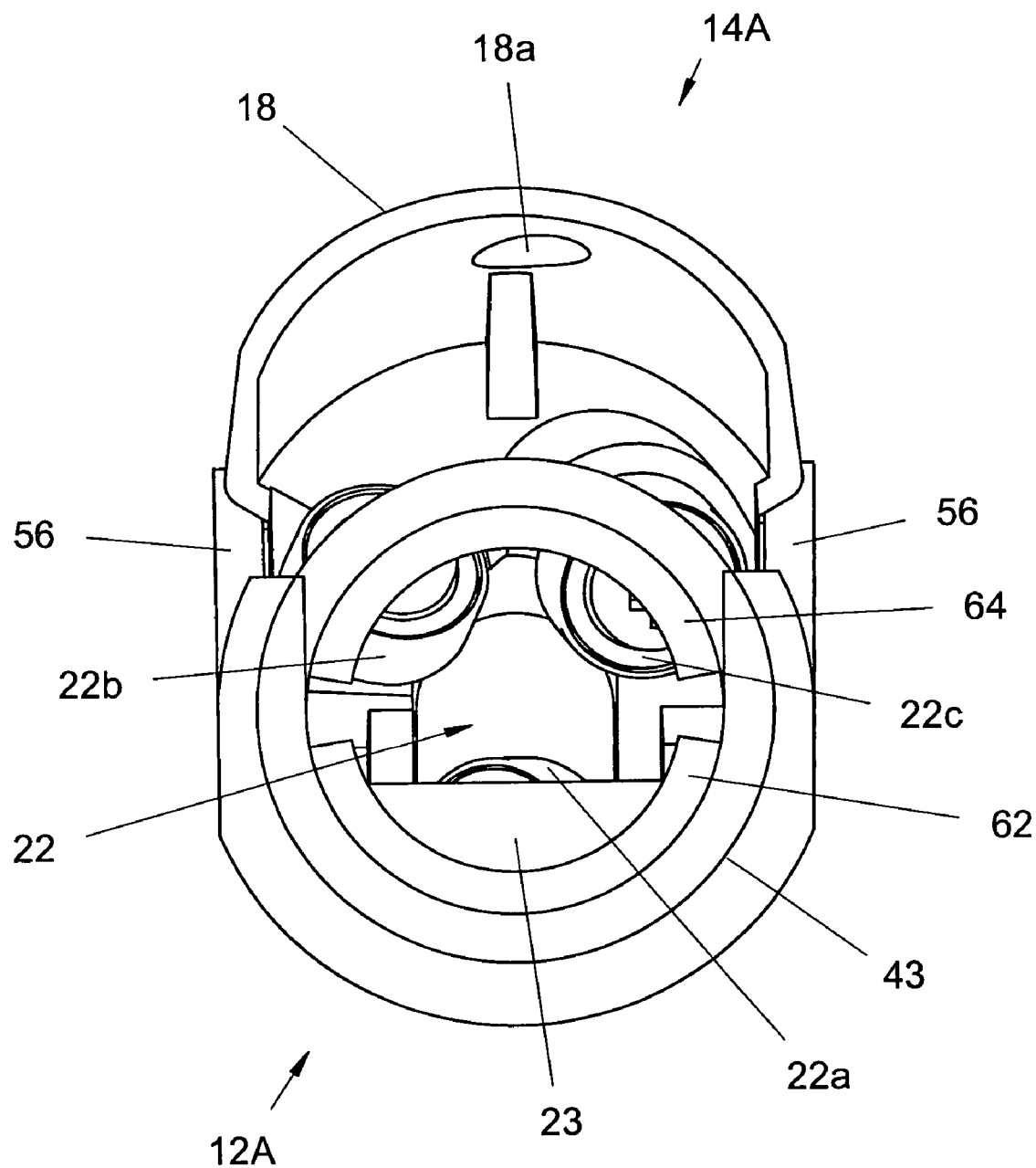
FIG. 7 is an end elevation view of the feeding device looking from left to right in FIG. 6.
Figure 8:
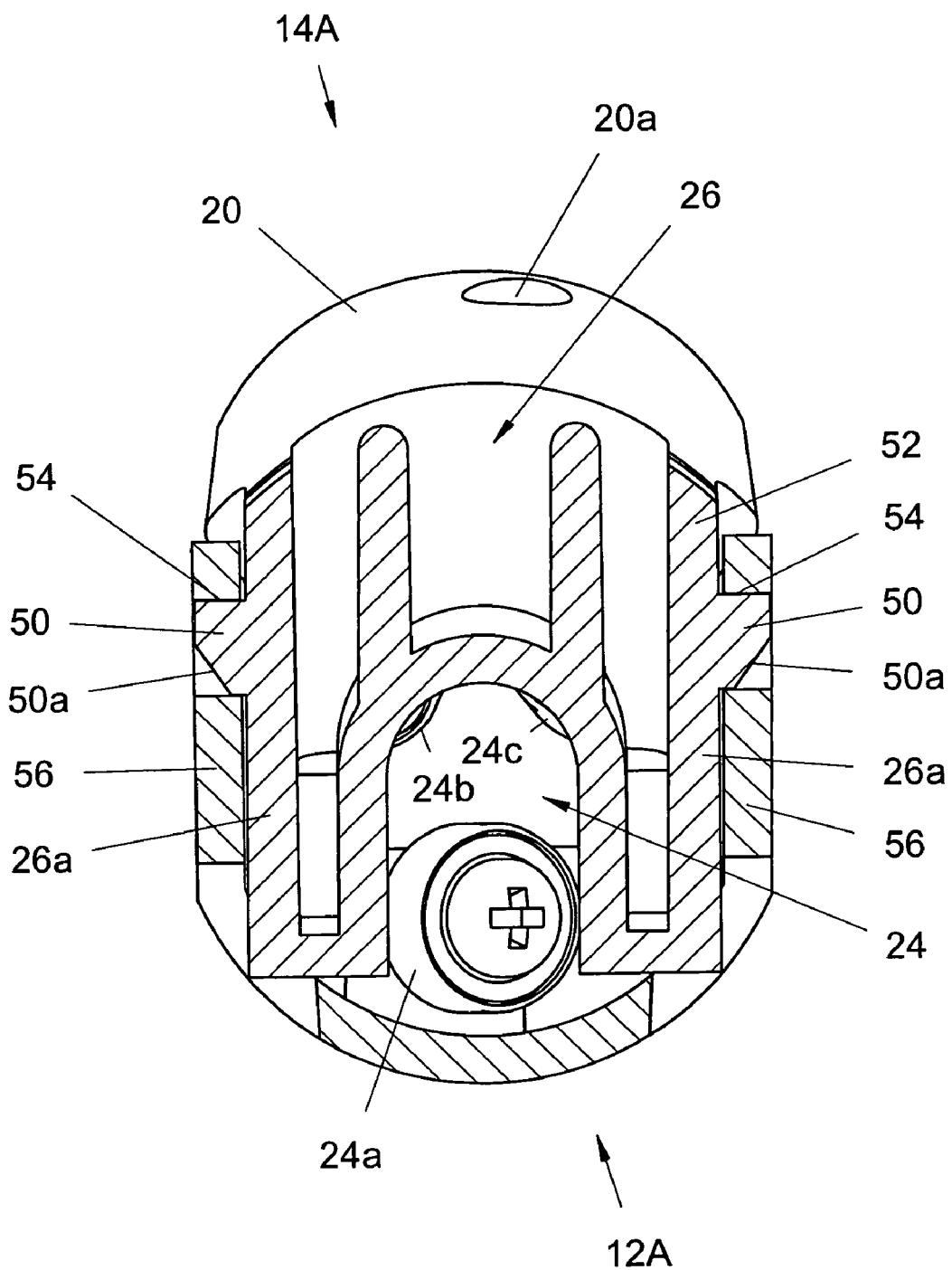
FIG. 8 is a cross-sectional elevation view taken along line 8-8 in FIG. 6.
Figure 9:
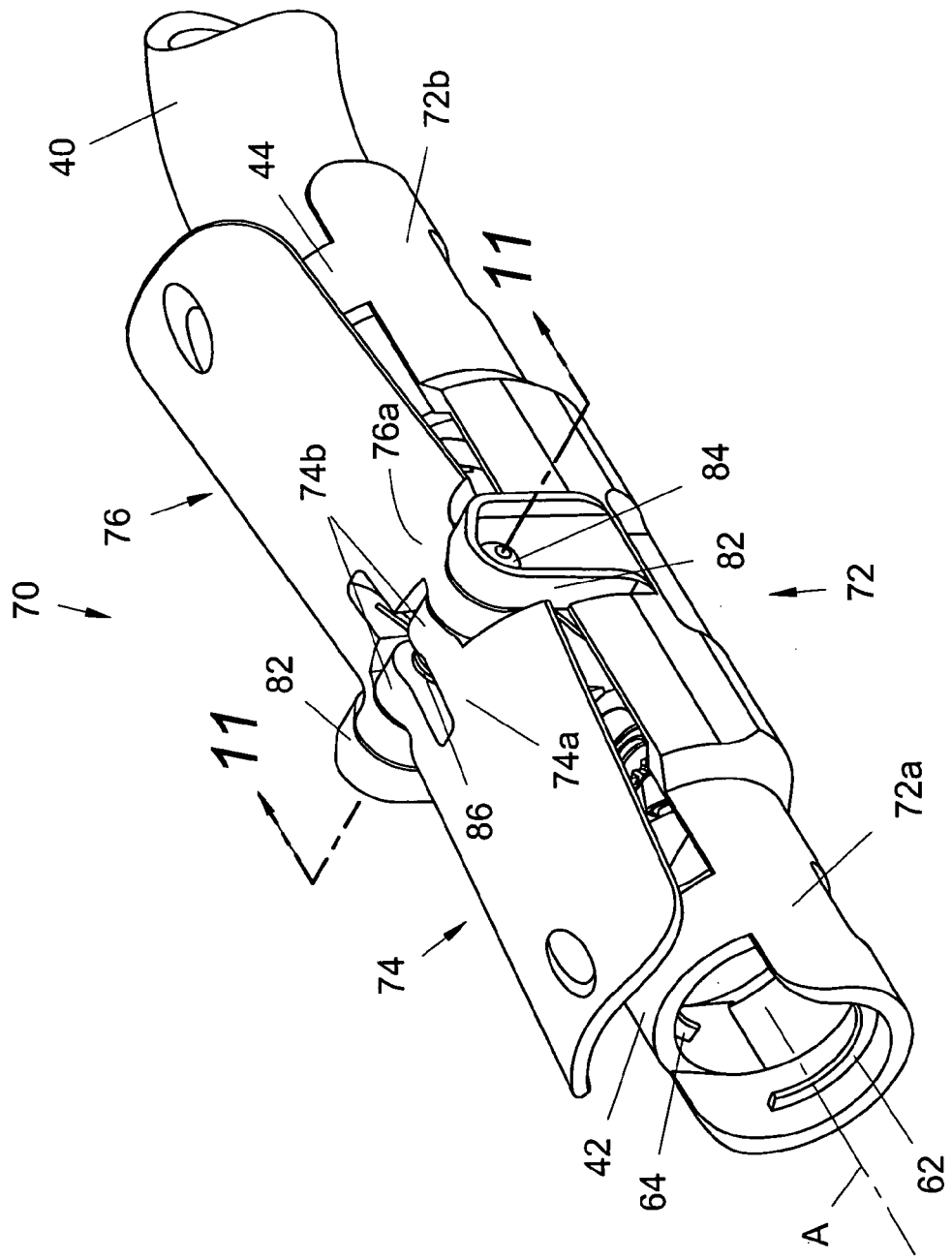
FIG. 9 is a perspective view of yet another embodiment of a snake feeding device in accordance with the invention.
Figure 10:
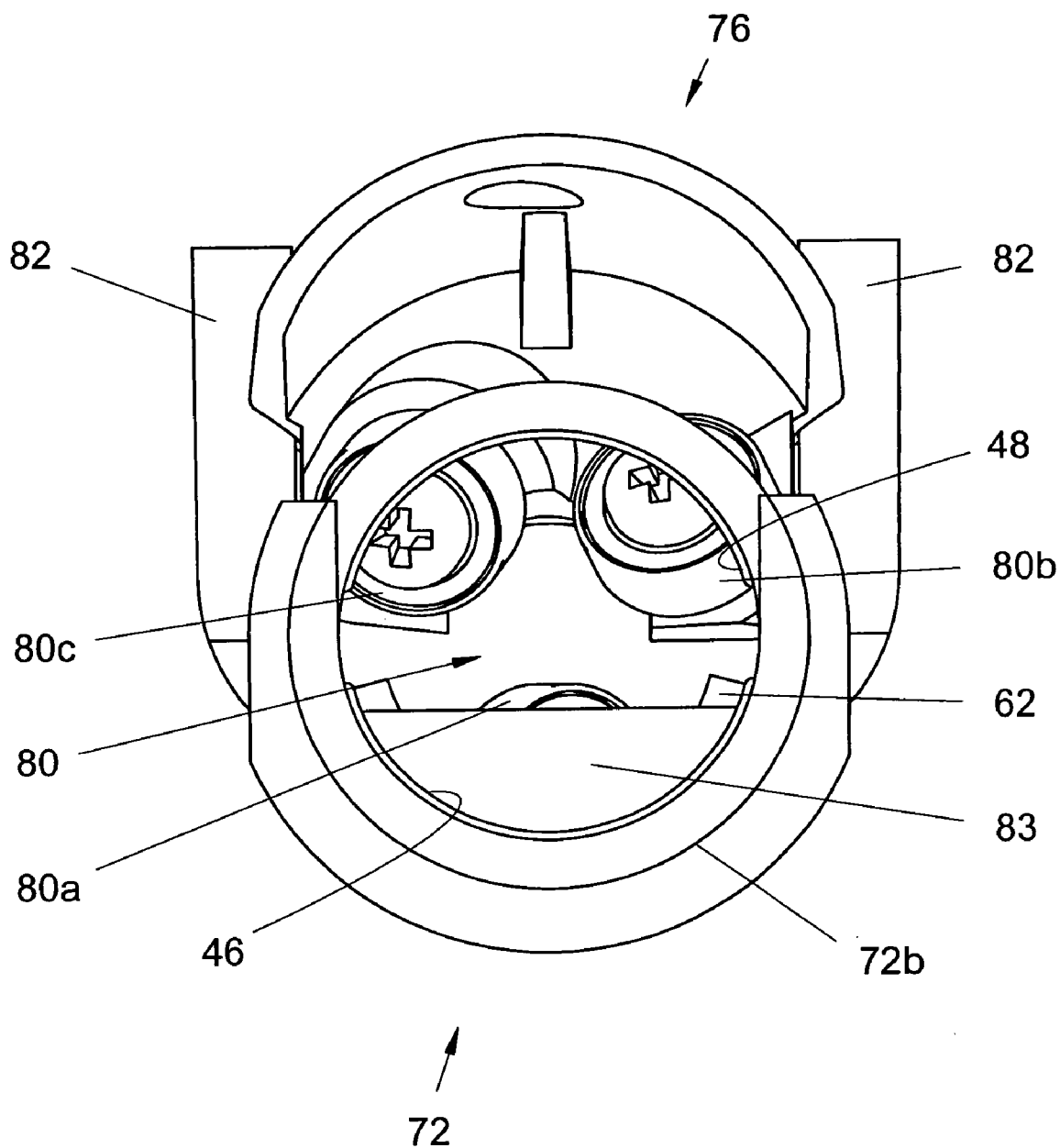
FIG. 10 is an end elevation view of the device looking from right to left in FIG. 9.
Figure 11:
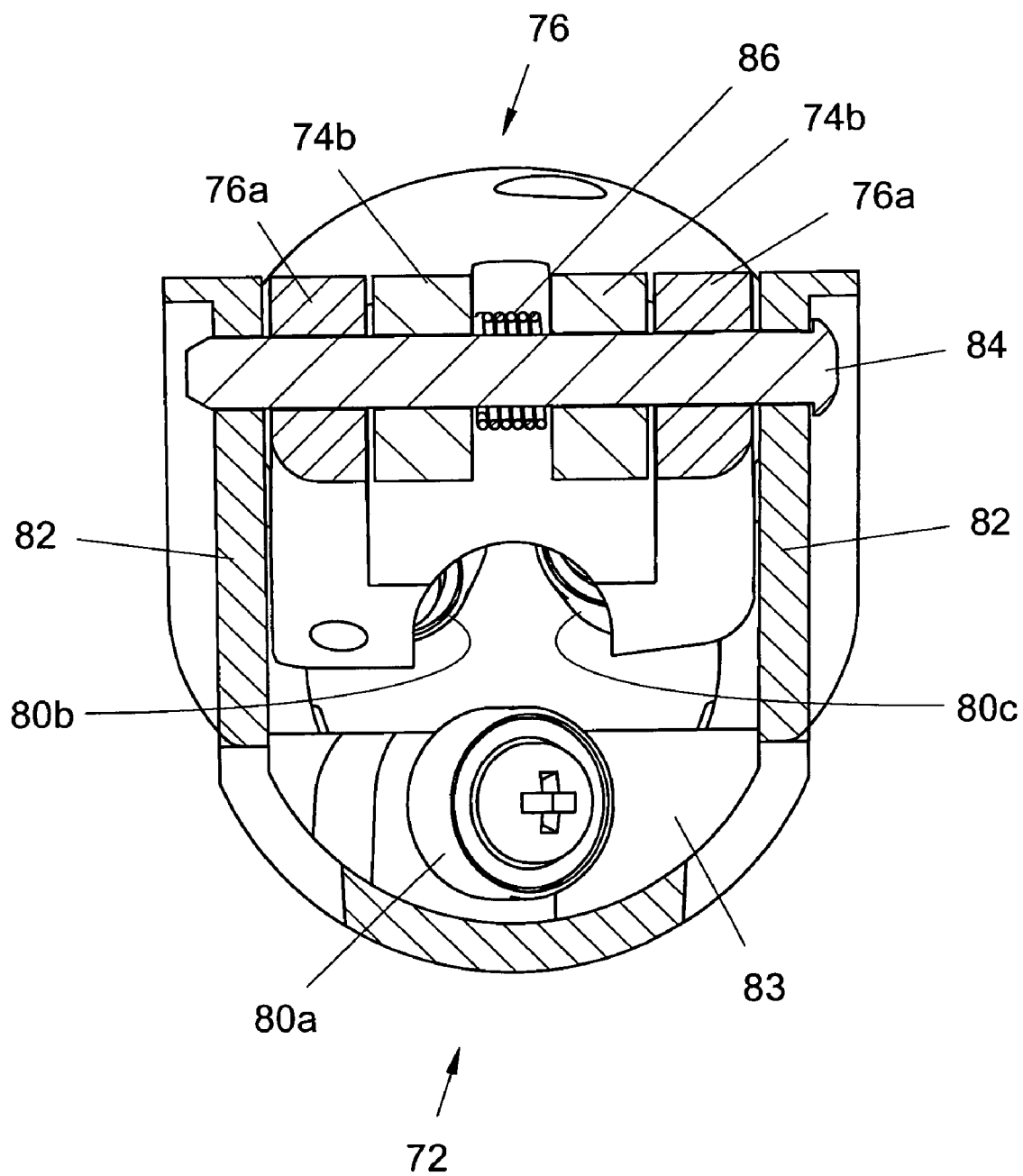
FIG. 11 is a cross-sectional elevation view taken along line 11-11 in FIG. 9.
Figure 12:
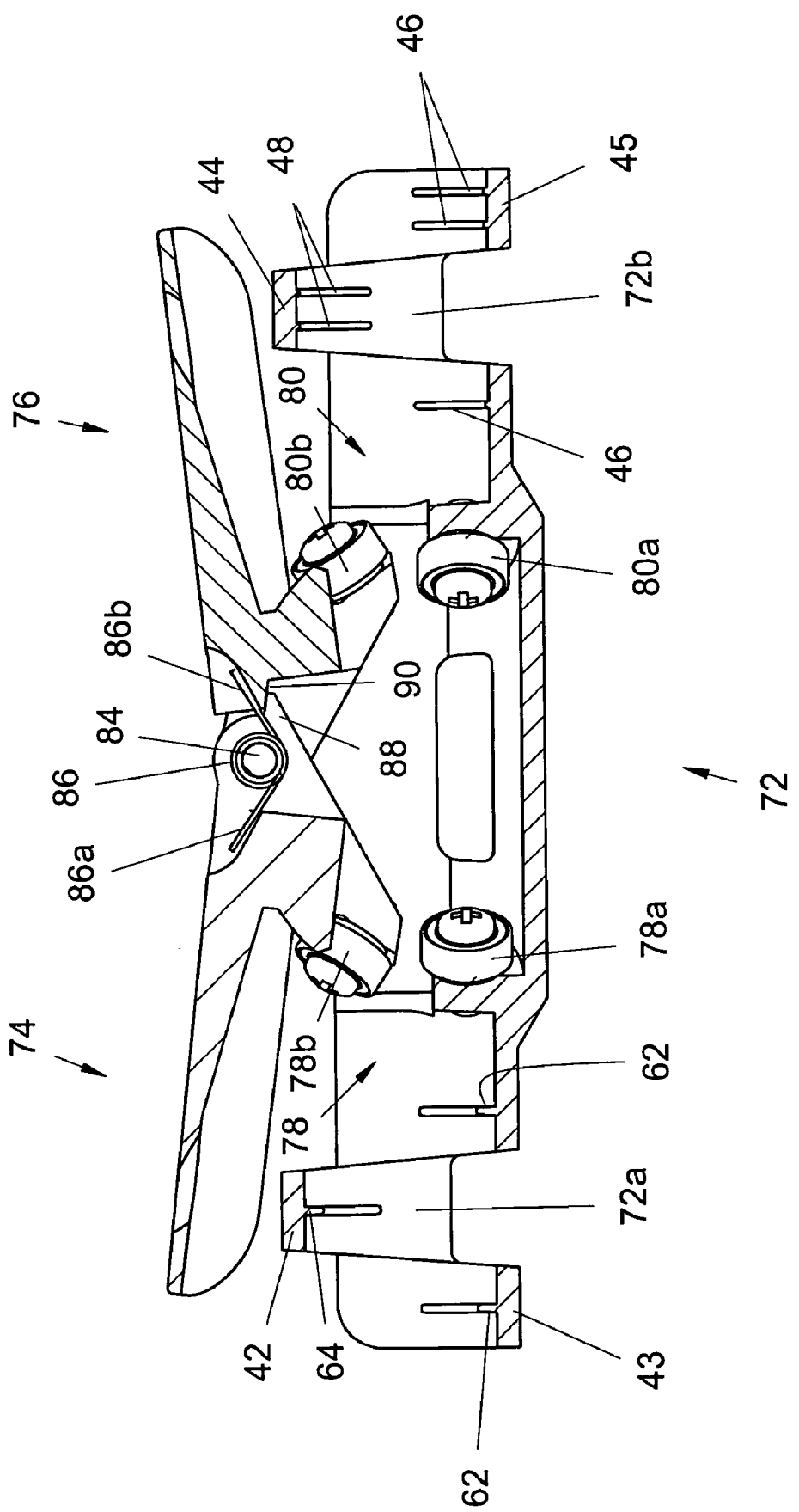
FIG. 12 is a longitudinal sectional elevation view of the snake feeding device shown in FIG. 9.
Figure 13:
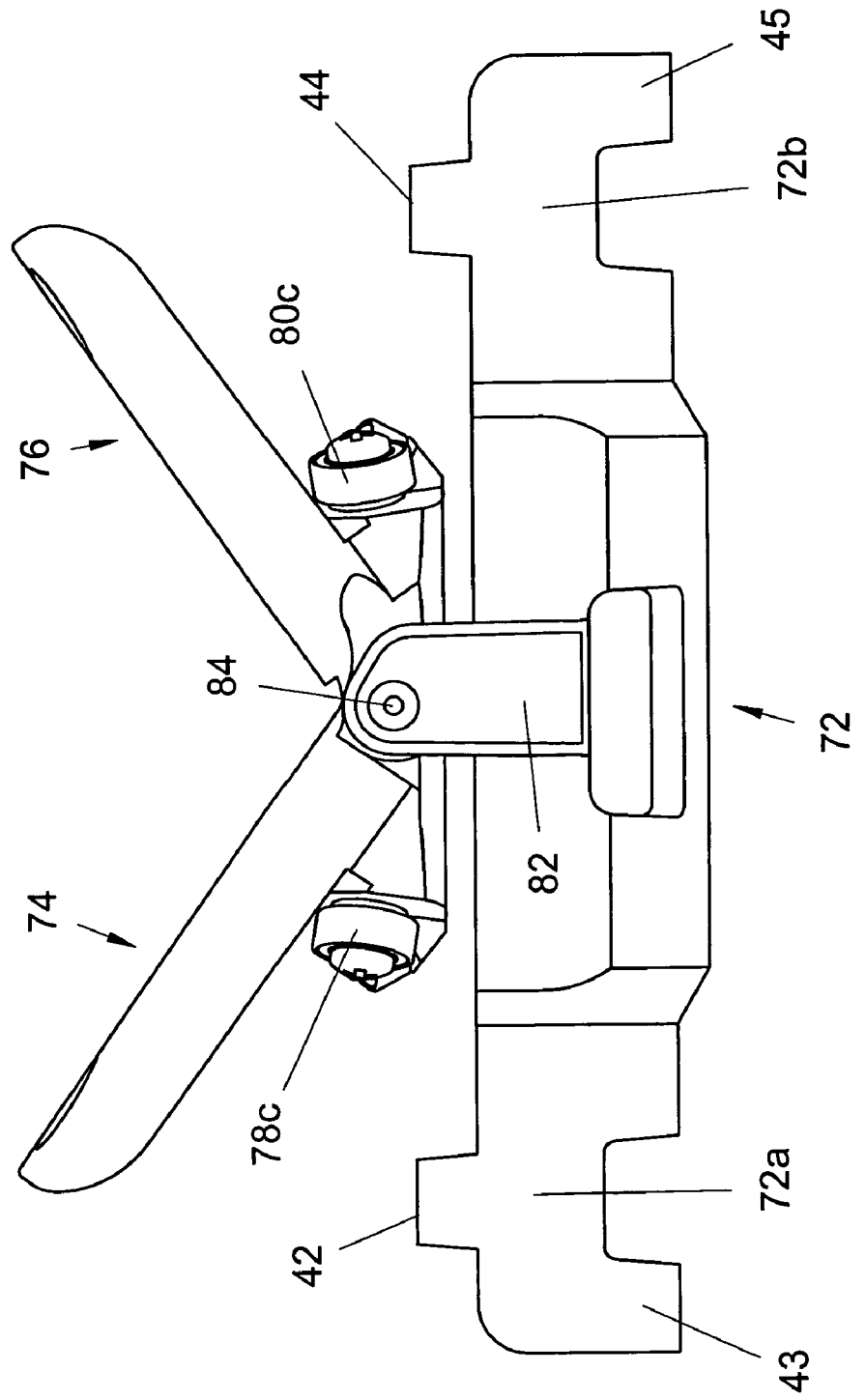
FIG. 13 is a side elevation view of the feeding device showing the actuators positioned to introduce or remove a snake from the device.

FIGS. 6-8 illustrate a modification of the mounting arrangement of the actuator from that shown in FIGS. 1-5. With the exception of the mounting arrangement, the other component parts of the device are the same as those in the embodiment of FIGS. 1-5 and, accordingly, are designated by like numerals. In the embodiment of FIGS. 6-8, pivot pin 16 is replaced by posts 50 extending laterally outwardly from flexible tabs 52 on the laterally opposite sides of actuator 14A and which posts are pivotally received in openings 54 in trunnions 56 on laterally opposite sides of base 12A. More particularly in this respect, side walls 26a of mounting portion 26 of actuator 14A are each provided with a pair of axially spaced apart vertical slots 58 which define the corresponding tab 52 and which, because of these slots, is adapted to be displaceable laterally inwardly of the corresponding trunnion 56 to disengage actuator 14A from base 12A. Accordingly, it will be appreciated that a user can squeeze tabs 52 laterally inwardly relative to one another in order to remove the actuator which, as in the embodiments of 1-5, facilitates feeding a bulb auger on the end of a snake through the device. The lower ends of posts 50 are provided with camming surface 50a which engage the upper ends of trunnions 56 to displace the tabs inwardly during remounting of the actuator to facilitate the remounting. Preferably, openings 54 are offset toward one of the axially opposite sides of the corresponding trunnion and the area of juncture between legs 18 and 20 of the actuator is provided with radially inwardly extending slots 60 profiled to preclude mounting of actuator 14A on base 12A other than in the orientation shown in FIG. 6. This, of course, assures that the rolls in each of the roll sets are canted in the same direction. In this respect, if a user or operator attempted to mount actuator 14A on base 12A in the orientation opposite that shown in FIG. 6, edges 60A of recesses 60 would engage vertical edge 56A of trunnions 56 to preclude the necessary alignment between posts 50 and openings 54 in the trunnions.

A modification of base 12A in this embodiment resides in the provision of ribs 62 and 64 in end 12a of the base to preclude attachment of a guide hose to that end of the device. More particularly in this respect, as will be appreciated from FIGS. 6 and 7, in comparison with FIG. 2, ribs 62 and 64 in end 12a of the base have a radial extent generally corresponding to the wall thickness of a guide tube, whereby insertion of the latter into end 12a of base 12A would be precluded by abutting engagement between the end of the tube and the ribs 62 and 64. In contrast, the resiliency of the guide tube material enables movement of a guide tube laterally past and thus into frictional engagement with ribs 48 on bridging portion 44 at end 12b (not visible) and ribs 46 on arcuate end portion 45 at end 12b.

FIGS. 9-13 illustrate yet another embodiment of a snake feeding device in accordance with the present invention. In this embodiment, the feeding device 70 comprises a trough-shaped base member 72 and an actuator defined by first and second actuator members 74 and 76, respectively, pivotally mounted on base 72 as set forth more fully hereinafter and extending axially in overlying relationship to the base. Feeding device 70 further includes first and second sets of drive rolls 78 and 80, respectively, defined by single drive rolls 78a and 80a mounted on base 72, and pairs of drive rolls 78b and 78c and 80b and 80c respectively mounted on actuators 74 and 76. Base 72 is structurally similar in some respects to bases 12 and 12A of the embodiments described hereinabove and, accordingly, component parts of the device illustrated in FIGS. 9-13 which correspond with those of the earlier embodiments are identified by like numerals. Base 72 has an axis A, axially opposite ends 72a and 72b and upstanding mounting plates 82 on laterally opposite sides of the base and generally centrally between ends 72a and 72b thereof. Rolls 78a and 80a are mounted on base 72 on axially opposite sides of mounting plates 82. End 72a of the base has ribs 62 and 64 on arcuate end portion 43 and bridging portion 42, for blocking the mounting of a guide tube to that end of the base as described herein, and end 72b of the base has ribs 46 and 48 on arcuate end portion 45 and bridging portion 44 for engaging a guide tube with the latter end as described herein.

Actuators 74 and 76 have axially inner ends 74a and 76a, respectively, which as described hereinafter have an interengaging tongue and groove profile providing for the inner ends to overlap, and the overlapping portions and mounting plates 82 are provided with laterally aligned openings, not designated numerically, for receiving a pin 84 by which the actuators are pivotally engaged with base 72. Actuator 74 is provided on the underside thereof with a pair of drive rolls 78b and 78c in overlying relationship with roll 78a of roll set 78, and the underside of actuator 76 is provided with a pair of drive rolls 80b and 80c which overlie drive roll 80a of roll set 80 which is mounted on base 72. More particularly in this respect, base 72 is arcuate in cross-section adjacent the central portion thereof and is provided with a pair of spaced apart walls 83 having axially inner sides on which the corresponding one of the drive rolls 78a and 80a is mounted. As will be appreciated from FIGS. 9,11 and 12, the axially innermost portion of end 74a of actuator 74 provides the tongue component of the tongue and groove profile between the inner ends of the actuators. The tongue component is defined by a pair of fingers 74b which are laterally spaced apart to receive a biasing spring 86 therebetween, which spring surrounds pin 84 and has opposite ends 86a and 86b extending axially outwardly into engagement with actuators 74 and 76, respectively, so as to bias each of the actuators downwardly toward base 72. As will be appreciated from FIG. 12, the axially overlapping inner ends of actuators 74 and 76 have interengaging finger and shoulder elements 88 and 90, respectively, which interengage to limit pivotal movement of the actuators toward base 72. Thus, as will be further appreciated from FIG. 12, the finger and shoulder elements interengage so as to provide a space between the upper and lower rolls of the corresponding roll set which is sufficient for a snake to pass therebetween and rotate relative to the roll sets without being axially driven thereby. As mentioned hereinabove, such positional relationship between the rolls of the roll sets provides a neutral position with respect to driving or feeding the snake relative to the device. As will be appreciated from FIG. 13, actuators 74 and 76 are adapted to be pivoted upwardly relative to base 72 to displace driving rolls 78b and 78c and 80b and 80c radially outwardly from the underlying rolls of the corresponding roll set. This position advantageously enables a snake having an enlarged auger end to be passed through the device along the axis thereof without having to disassemble any parts of the device.

In use, a snake extends through the device, and a user can selectively depress either one of the levers 74 and 76 toward base 72 to engage the snake between the drive rolls of the corresponding roll set, whereby the snake will be axially displaced relative to the device upon rotation of the snake relative thereto and in the axial direction depending on which of the roll sets is engaged therewith. In order to reverse the direction of drive of the snake, the operator releases the one lever and pivots the other lever toward base 72, whereupon the driving rolls on the one lever are displaced from engagement with the snake and the drive rolls on the other lever are engaged with the snake to displace the latter against the corresponding drive roll on the base.

Figure 14:
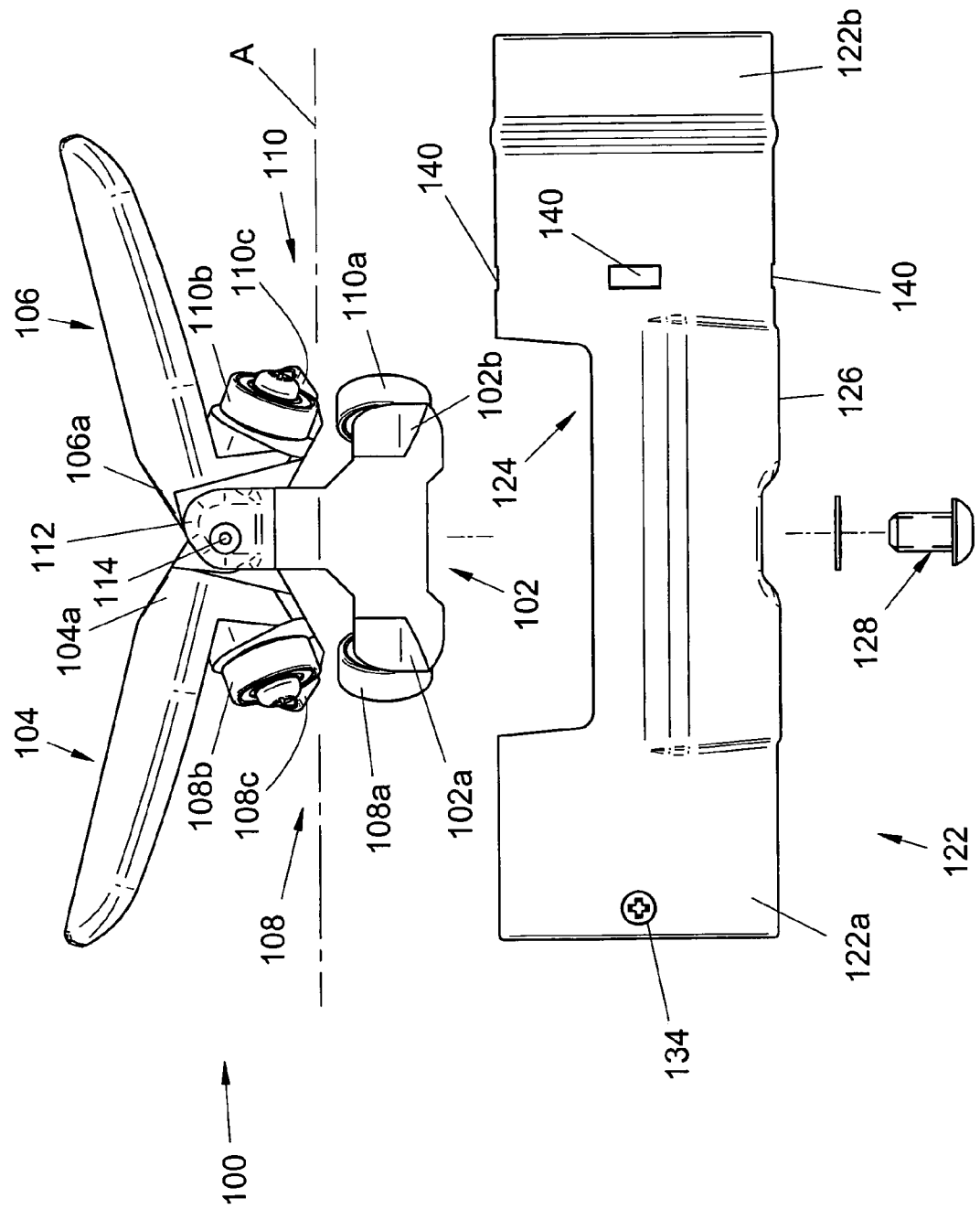
FIG. 14 is an exploded side elevation view of a further embodiment of a snake feeding device in accordance with the invention.
Figure 15:
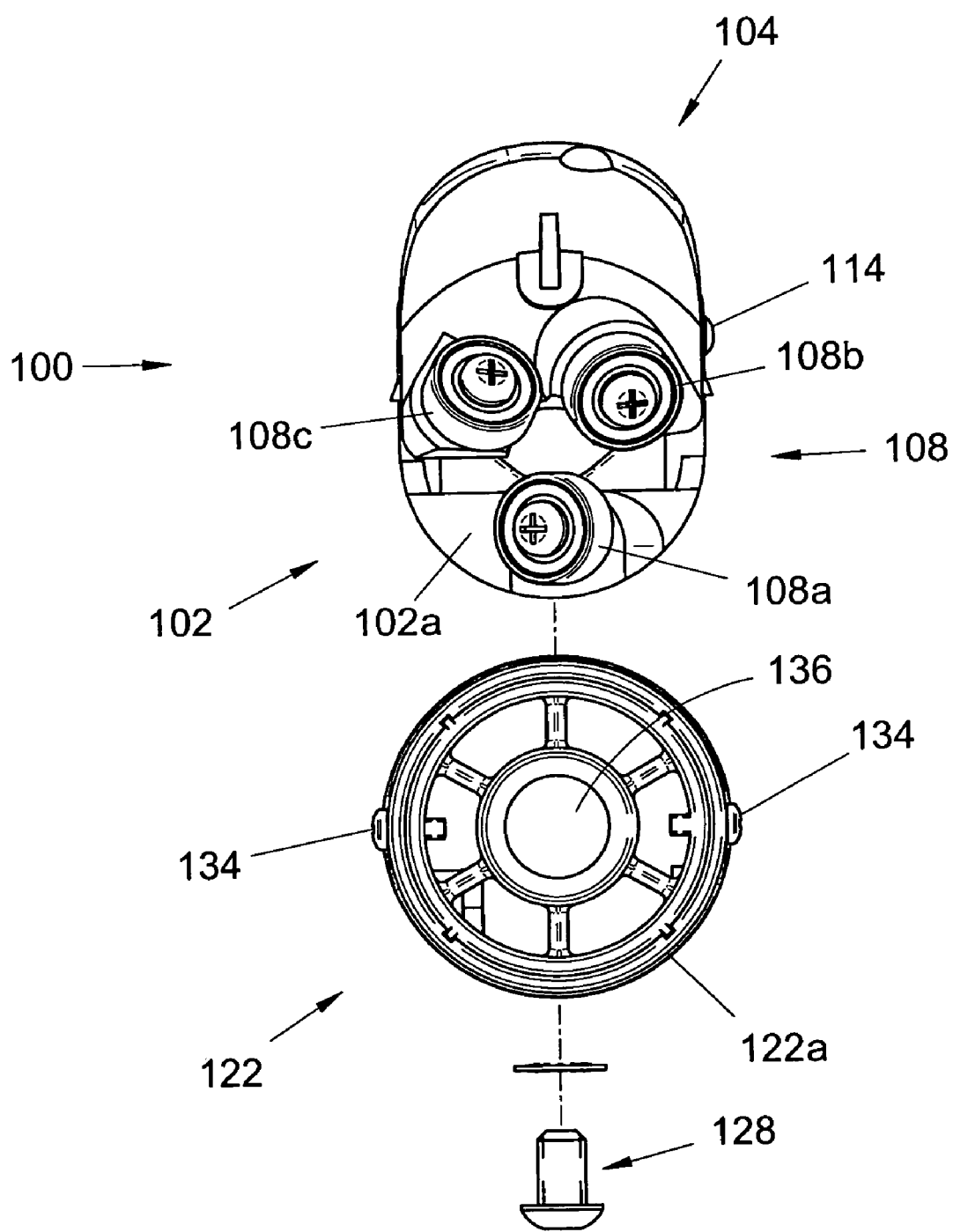
FIG. 15 is an exploded end elevation view of the device looking from left to right in FIG. 14; and, FIG. 16 is a sectional side elevation view of the device showing the parts in assembled relationship.
Figure 16:
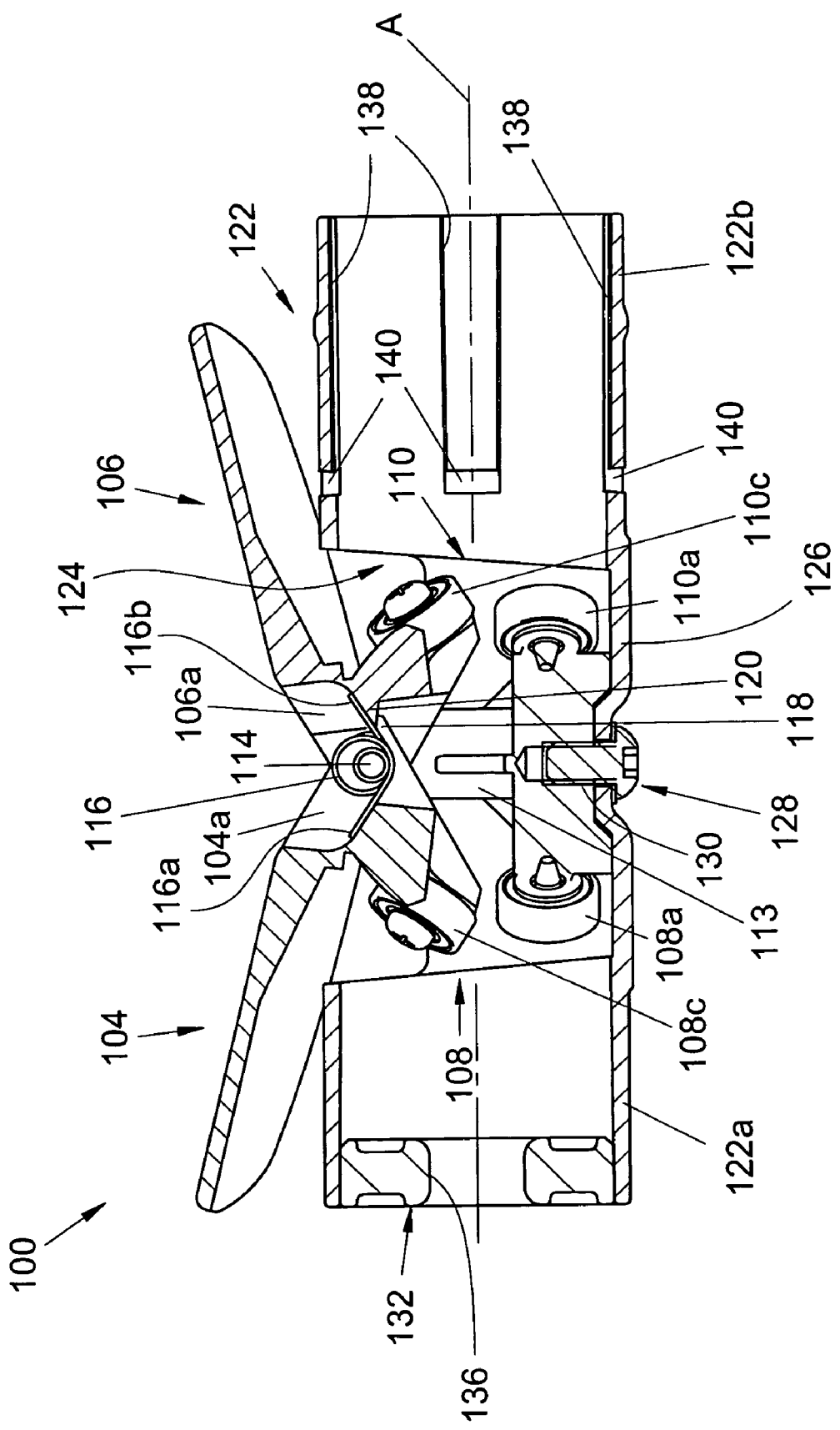

FIGS. 14-16 illustrate a further embodiment of a snake feeding device in accordance with the present invention. In this embodiment, the feeding device 100 comprises a base member 102 having an axis A and axially opposite ends 102a and 102b, and an actuator defined by first and second actuator members 104 and 106, respectively. The actuator members are pivotally mounted on base 102 as set forth more fully hereinafter and extend axially outwardly in opposite directions from a location generally centrally between the opposite ends of base 102 to a location outwardly of the corresponding end of the base. The feeding device further includes first and second sets of drive rolls 108 and 110, respectively, defined by single drive rolls 108a and 110a respectively mounted on end 102a and end 102b of the base, and pairs of drive rolls 108b and 108c and 110b and 110c respectively mounted on actuator members 104 and 106 as set forth hereinafter.

Base 102 has laterally spaced apart upstanding mounting plates 112 and 113, and actuator members 104 and 106 have axially inner ends 104a and 106a, respectively, which overlap as described hereinabove in connection with the embodiment of FIGS. 9-13, and the overlapping portions and mounting plates 112 and 113 are provided with laterally aligned openings, not designated numerically, for receiving a pin 114 by which the actuators are pivotally engaged with base 102. Actuator 104 is provided on the underside thereof at inner end 104a with drive rolls 108b and 108c in overlying relationship with drive roll 108a of roll set 108, and the underside of actuator 106 at inner end 106a thereof is provided with drive rolls 110b and 110c which overlie drive roll 110a of roll set 110. As described herein with regard to the embodiment in FIGS. 9-13, the axially overlapping inner ends of actuator members 104 and 106 provide a tongue component defined by a pair of fingers which are laterally spaced apart to receive a biasing spring 116 therebetween, which spring surrounds pin 114 and has opposite ends 116a and 116b extending axially outwardly into engagement with actuator members 104 and 106, respectively, so as to bias each of the actuator members downwardly toward base 102. As will be appreciated from FIG. 16, the axially overlapping inner ends of actuators 104 and 106 have interengaging finger and shoulder elements 118 and 120, respectively, which interengage to limit pivotal movement of the actuators toward base 102. Thus, as will be further appreciated from FIG. 16, the finger and shoulder elements interengage so as to provide a space between the upper and lower rolls of the corresponding roll set which is sufficient for a snake to pass therebetween and rotate relative to the roll sets without being axially driven thereby. As mentioned herein, in connection with the embodiment of FIGS. 9-13, such positional relationship between the rolls of the roll sets provides a neutral position with respect to driving or feeding the snake relative to the device.

Further in accordance with the embodiment of FIGS. 14-16, feeding device 100 is adapted to be removably mounted in a housing 122 which, preferably, is circular in cross-section and has an axis which is coaxial with axis A of the feeding device when the latter is mounted therein. More particularly, housing 122 has axially opposite ends 122a and 122b axially outwardly of ends 102a and 102b of base 102, respectively, and the housing has an open portion 124 between the ends thereof which is adapted to receive base 102 of the feeding device in a manner whereby actuator members 104 and 106 extend outwardly of the open portion. Housing 122 includes a wall 126 opposite open portion 124, and base member 102 and thus feeding device 100 is removably attached to wall 126 by means of a threaded fastener 128 extending through an opening therefor in wall 126, not designated numerically, and into a threaded bore 130 in the bottom of base member 102. The removability of feeding device 100 from housing 122 advantageously facilitates access to the drive roll components as well as the base and actuator members for the purpose of cleaning, replacement or the like. In this embodiment, end 122a of the housing is provided with an annular snake guide component 132 which is received in end 122a and removably secured therein by threaded fasteners 134 and which includes a central opening 136 therethrough for receiving a snake. End 122b of housing 122 is provided with a suitable arrangement for attaching the housing to an associated device. The attaching arrangement can be of any desired structure for attaching the housing to an associated device and, for example, can be structured as shown in the embodiments of FIGS. 1-13 for attachment to a guide tube. In the embodiment illustrated in FIGS. 14-16, the attachment arrangement is defined by axially extending recesses 138 extending axially inwardly from end 122b of the housing and terminating in slots 140 opening outwardly of the housing. This arrangement facilitates mounting the feeding device, for example, on the snake guide tube extending forwardly of the drum of a motor driven, handheld drain cleaner of the character referred to at the outset hereof.

In use, the device is operable in the manner described hereinabove with regard to the embodiment of FIGS. 9-13. Further, as with the embodiment of FIGS. 9-13, actuator members 104 and 106 are adapted to be pivoted upwardly relative to base 102 to displace the driving rolls thereon radially outwardly from the underlying rolls of the corresponding roll set to enable passing a snake having an enlarged auger end through the device along the axis thereof without having to disassemble any parts of the device.

While considerable emphasis has been placed herein on the structures and structural interrelationships between the component parts of preferred embodiments of the invention, it will be appreciated that other embodiments as well as modifications of the preferred embodiments can be made without departing from the principals of the invention. In this respect, for example, it will be appreciated that each of the roll sets can be comprised of at least two rolls, one on the base and one on the actuator, or two rolls on each of the base and actuator, or a reversal of the arrangement herein illustrated which would provide two rolls on the base and one on the actuator. These and other modifications will be obvious and/or suggested from the disclosure herein. Accordingly, it is to be distinctly understood that the foregoing descriptive matter is to be interpreted merely illustrative of the invention and not as a limitation.

Having thus described the invention, it is so claimed:

1. A snake feeding device comprising:
   a base having opposite ends;
   first and second sets of drive rolls spaced apart in the direction between said ends, each said set including at least two relatively displaceable rolls for engaging a snake therebetween and displacing the snake relative to said base in the direction between said ends in response to rotation of the snake;
   an actuator for selectively displacing the rolls of each set relative to one another; and,
   a housing removably receiving said base, the housing having a first end spaced outwardly of one of said opposite ends of said base and a second end spaced outwardly of the other of said opposite ends, wherein said actuator is pivotally mounted on said base and wherein each set of drive rolls includes a first roll mounted on said base and at least one second roll mounted on said actuator.

2. A snake feeding device according to claim 1, wherein said actuator is pivotal relative to said base about an axis transverse to the direction between said ends.

3. A snake feeding device according to claim 1, wherein said actuator includes a first actuator for the at least one second roll of one of said sets and a second actuator for the at least one second roll of the other of said sets.

4. A snake feeding device according to claim 3, wherein the first and second actuators are pivotal about a common axis.

5. A snake feeding device according to claim 1, wherein said housing is tubular and includes an open portion between said first and second ends, said base being received in said open portion and said actuator extending outwardly of said open portion.

6. A snake feeding device according to claim 5, wherein said housing includes a wall opposite said open portion, said base being removably mounted on said wall.

7. A snake feeding device comprising:
   a first member having an axis and axially opposite ends;
   a pair of second members each overlying a different axial portion of said first member and being supported thereon for displacement between first and second positions, first driving rolls mounted on said first member in axially spaced locations, second driving rolls mounted on said second members in locations thereon for the first and second driving rolls in each location to engage a snake therebetween in the first position of the corresponding second member; and,
   a tubular housing having axially opposite first and second ends each axially outwardly of a corresponding one of the opposite ends of the first member, said housing having an open portion between the opposite ends thereof, said first member being received in said open portion and removably attached to said housing, and said second members extending outwardly of said open portion.

8. A snake feeding device according to claim 7, and means biasing each of the second members toward the first member.

9. A snake feeding device according to claim 7, wherein each said second member is pivotally mounted on said first member.

10. A snake feeding device according to claim 9, wherein said second members are pivotal about a common axis.

11. A snake feeding device according to claim 7, wherein said first end includes means for coupling said housing to an associated device and said second end includes a snake guide.

12. A snake feeding device comprising:
    a base having an axis and axially opposite ends, first drive rolls on said opposite ends,
    an actuator pivotally mounted on said base,
    second drive rolls on said actuator overlying said first drive rolls, said actuator being displaceable relative to said base for selectively displacing said second drive rolls toward said first drive rolls to engage a snake therebetween; and,
    a tubular housing having axially opposite ends and an open portion between said ends, said base being mounted in said open portion and said actuator extending outwardly of said housing.

13. A snake feeding device according to claim 12, wherein said first drive rolls includes a single roll on each of the opposite ends of said base and said second drive rolls includes a pair of rolls overlying each single roll on said base.

14. A snake feeding device according to claim 12, wherein said housing includes a wall opposite said open portion, said base being removably attached to said wall.

15. A snake feeding device according to claim 12, wherein said actuator extends in axially opposite directions relative to said base beyond each of the opposite ends thereof.

16. A snake feeding device according to claim 15, wherein said actuator is pivotal about a pivot axis and includes a first actuator extending in one of said opposite directions from said pivot axis and a second actuator extending on the other of said opposite directions from said pivot axis.

17. A snake feeding device according to claim 16, wherein said first drive rolls includes a single roll on each of the opposite ends of said body and said second drive rolls includes a pair of rolls mounted on each said first and second actuator.

18. A snake feeding device according to claim 17, wherein each said first and second actuator is biased to displace the corresponding pair of rolls toward the corresponding single roll.

19. A snake feeding device according to claim 18, wherein the tubular housing has first and second axially opposite ends and the open portion between said ends, said first and second actuators extending outwardly of said housing.

20. A snake feeding device according to claim 19, wherein said housing includes a wall opposite said open portion, said base being removably attached to said wall.

21. A snake feeding device according to claim 20, wherein said first end includes means for coupling said housing to an associated device and said second end includes a snake guide.

* * * * *